Patented June 2, 1936

2,042,833

UNITED STATES PATENT OFFICE 2,042,833

MANUFACTURE OF PORTLAND CEMENT

Harvey Randolph Durbin, New Rochelle, N. Y., assignor to International Cement Corporation, New York, N. Y., a corporation of Maine No Drawing. Application August 26, 1933, Serial No. 687,019

4 Claims. (Cl. 106—25)

This invention relates to the manufacture of Portland cement, and more particularly to a novel and advantageous process for the production of high early strength cements, utilizing the principle disclosed in my Patents 1,700,032 and 1,700,033, dated January 22, 1929.

The present invention is based upon the discovery that the improved product of these patents can be obtained, while certain additional advantages are secured, by mixing once burned Portland cement clinker or Portland cement with a slurry of raw cement forming ingredients, including sufficient lime completely to saturate the silicates and alumina, and burning the mixture. In the preferred practice of the process ground clinker is fractionated into relatively fine and relatively coarse particles certain of which are reburned, preferably in the presence of a slurry of the character indicated. The invention also includes the fractionation of burned Portland cement clinker containing an excess of free lime and the reburning of a portion of the separated materials.

Other objects and advantages of the invention will appear as the following description of certain illustrative embodiments of my invention proceeds.

For example, a mix of argillaceous and calcareous materials may be prepared in the form of a slurry, generally in accordance with accepted practice in making mixes for the wet process, but with an excess of lime over what will combine with the argillaceous materials in a single burn, and to this slurry is added an amount, preferably about 15 to 40% of the weight of the dry materials in the slurry, of normal Portland cement clinker or Portland cement. The clinker may be added to the slurry and ground therewith, or separately ground, and may vary considerably in composition. Preferably, the composition of the slurry and added clinker is such that, giving consideration to the ash of the fuel employed for burning, where coal is mixed with the materials, the resulting clinker formed by burning the materials will be such that the ratio expressed by $$\frac{\text{Lime} - (1.65 \text{ alumina} + .35 \text{ iron oxide} + .7 \text{ sulphurous anhydride})}{\text{Silica}}$$

is less than 2.8. While this ratio applies to the preferred process, it will be understood, as hereinafter pointed out, that the process may be carried out using a larger proportion of lime.

The slurry including the cement, preferably intimately intermingled with the other ingredients, is then burned in the usual manner, the burning being commenced shortly after the mix is prepared, although, if desired, the slurry may be filtered before burning to remove some of the water.

While satisfactory results may be achieved by carrying out the process as described, that is to say, by adding a percentage of the entire clinker from a previous reaction to raw mix, further advantages may be secured where a once or twice burned clinker containing substantially no free lime, after being ground, is fractionated into relatively fine and relatively coarse particles in accordance with the teachings of the copending application of Einar Posselt and myself, Serial No. 620,362, filed July 1, 1932, and only the latter are reburned in the slurry in the presence of lime. In such process, in brief, a clinker is ground to suitable fineness, say until 80-94 percent will pass a 200-mesh screen, and the ground material is fractionated in an air separator, or otherwise, to separate the coarse particles of above about 20-60 microns, or more specifically above about 30-40 microns, from the fines, the former being reburned and the latter forming the product. Where a clinker having a lime-silica ratio of the character above indicated is ground to the extent mentioned, some 35 percent of the ground material may be, roughly, coarser than 40 microns, and such fraction, or a larger or smaller fraction of this general character, may be mixed with the slurry as hereinabove described, the other fraction forming the finished product. This operation is preferably made continuous by continuously fractionating the ground clinker and returning the coarse particles to the slurry to be burned in the same kiln. It may also be applied by fractionating the clinker from one kiln and mixing the coarse particles with the slurry for a second kiln. In such a procedure it may be unnecessary to fractionate the clinker from the second kiln.

A remarkable thing about the present process is that the hydraulic properties of the cement do not appear either to interfere with the free flow of the material through a kiln or even with the filtering. At the same time the process is economical to carry out, has the merits of the wet process, and produces a superior product.

While my process is particularly adapted to treatment of mixes in which the lime-silica ratio is such that there is very little or no excess of uncombined lime in the clinker, it may be carried out in conjunction with fractionation of a clinker including lime in excess of that which will combine with the argillaceous materials of the clinker even during a repeated burning. Where such an excess of lime is employed, the clinker is preferably subjected to a preliminary light grinding and the ground material is fractionated into relatively fine and relatively coarse particles. The fine particles will contain the free lime and may be used to supply lime in a reburning step. The coarser particles may be reground to reduce them to a suitable fineness for use as Portland cement, and may be mixed with gypsum to produce the finished product. However, I prefer to regrind the coarser particles from the preliminary grinding and separation, and again make a separation between the relatively coarse and relatively fine particles, the coarse particles from the second separation being reburned, preferably in the presence of a slurry containing lime sufficient to react with and completely saturate the silicates and alumina in said coarse particles as well as in the raw argillaceous materials in the mix. In this manner, it is possible initially to separate the excess lime from the clinker and then to separate the major part of the coarse di-calcium silicate from the fine tri-calcium silicate, in the secondary separation, the former being reburned in the presence of the lime and the latter constituting a high-grade early strength cement.

The extent to which the grinding is carried for the preliminary and secondary separations may be varied depending upon the fraction which is to be reburned, but in general, the preliminary grinding is preferably light as compared to the secondary grinding. However, it will be understood that instead of the two grinding operations, the clinker may be ground in a single operation to such fineness that the very fine and very coarse fractions may be separated, as by air separation or screening, from the intermediate fraction.

Where the term "Portland cement" is employed in the specification and claims it intends any clay or other alumino-siliceous material combined with lime by means of a burning operation, and includes products obtained by pulverizing clinker produced by calcining to incipient fusion an intimate and properly proportioned mix of argillaceous and calcareous materials, especially where at least a part of the clinker has been reburned to saturate the silicates. The term "mix" includes mixtures of argillaceous and calcareous materials in which the lime is only sufficient to react with argillaceous materials to the extent possible in a single burning as well as mixtures in which the lime is also sufficient to saturate silicates in the coarse particles. By "lime", as used herein, is meant any compound which furnishes lime on calcination at the temperatures employed.

The terms and expressions which have been employed are used as terms of description and not of limitation, and there is no intention in the use of such terms and expressions, of excluding any equivalents of the features shown and described, or portions thereof, but it is recognized that various modifications are possible within the scope of the invention claimed.

I claim:

1. In the manufacture of Portland cement, the steps of burning a cement mixture containing an excess of free lime to produce a clinker, grinding the clinker and separating the fines containing the excess of free lime above that permissible in the finished cement.

2. A method for preparing high early-strength cements comprising burning cement raw ingredients to form a clinker containing an excess of free lime, grinding the clinker, subjecting the ground clinker to mechanical separation to remove the fraction containing fine particles and the excess free lime.

3. A method for preparing high early-strength cements comprising burning cement raw ingredients to form a clinker containing an excess of free lime, grinding the clinker and subjecting the ground clinker to a mechanical separation to remove the fraction containing fine particles and the excess free lime and to remove the fraction containing the coarse particles and unsaturated silicates.

4. A method for preparing high early-strength cements comprising burning cement raw ingredients to form a clinker containing an excess of free lime, subjecting the clinker to a light grinding and separating the fines containing the excess free lime and thereafter subjecting the coarse particles to a further grinding and separating the coarser particles containing unsaturated silicates.

HARVEY RANDOLPH DURBIN.